United States Patent [19]

Brierley

[11] 4,172,400

[45] Oct. 30, 1979

[54] SHREDDER

[76] Inventor: Zachry Brierley, West Point, Gloddaeth Ave., Llandudno, Gwynedd, Wales

[21] Appl. No.: 886,155

[22] Filed: Mar. 13, 1978

[30] Foreign Application Priority Data

Apr. 7, 1977 [GB] United Kingdom ............... 14709/77

[51] Int. Cl.[2] ............................................ B23D 19/06

[52] U.S. Cl. ...................................................... 83/500

[58] Field of Search .......................... 83/500, 482, 503

[56] References Cited

U.S. PATENT DOCUMENTS

| | | | |
|---|---|---|---|
| 592,869 | 11/1897 | Hannum | 83/482 |
| 782,977 | 2/1905 | Madden | 83/500 |
| 1,783,869 | 12/1930 | Allen | 83/503 |
| 3,033,064 | 5/1962 | Lee | 83/500 |
| 3,126,780 | 3/1964 | Booth | 83/500 |

FOREIGN PATENT DOCUMENTS

| | | | |
|---|---|---|---|
| 2460484 | 7/1976 | Fed. Rep. of Germany | 83/500 |

*Primary Examiner*—Donald R. Schran
*Attorney, Agent, or Firm*—Ross, Ross & Flavin

[57] ABSTRACT

A shredder for shredding paper sheets in which a pair of buttress-threaded screws, one of left hand thread and one of right hand thread, are arranged side by side with their threads in mesh. The screws co-rotate in opposition directions so that paper sheets, fed therebetween, are shredded.

1 Claim, 3 Drawing Figures

SHREDDER

BACKGROUND OF THE INVENTION

This invention concerns shredders for use, in shredding sheet materials such as paper. Such shredders are used, for example, in offices, banks, and other commercial and industrial establishments to shred confidental documents, to destroy used cheques, and for like purposes.

I have already proposed, in my prior British Pat. No. 1315320, a shredder construction which comprises a complementary pair of left-hand and right-hand square threaded screws arranged parallel to and in mesh with one another, and adopted for co-rotation in opposited directions, and means (which may be a handle or may be a motor) for rotating said screws.

With such a shredder, problems can arise in ensuring that the shreds, generated by operation of the shredder, do not accumulate in the grooves present between the lands of the threads of the screws. While we have already proposed a possible stripper arrangement, this has not proved to be particularly reliable in practice.

BRIEF SUMMARY OF THE INVENTION

We have now determined that the possibility of accumulation of shreds as aforesaid can be minimised by selection of an appropriate thread shape.

Pursuant hereto, the present invention provides a shredder, for shredding sheet materials, comprising a complementary pair of left-hand and right-hand screws arranged parallel to and in mesh with one another, and adapted for co-rotation in opposite directions, and means for rotating said screws, the screws being each buttress threaded, providing on one side of each helix a relatively square face and on the other side a face inclined to the axis of the screw.

It will be appreciated that with such an arrangement, the confronting relatively square faces of the two screws cooperate for serving the sheet material into shreds, whilst the confronting inclined faces have a clearance therebetween. If the outermost surface of each screw thread is toothed or indented, the shreds, as they are severed, are impressed longitudinally with the shapes of the teeth, and in practice this has the effect of causing the shreds themselves to wind into helices, which curve away naturally from the grooves of the screws, and which, therefore, do not accumulate in the grooves.

The screws may, if desired, be produced by appropriate machining of a rod-like workpiece. For convenience of manufacture, however, each of the screws may, if desired, comprise a respective central shaft around which is disposed a buttress-thread sectioned helical spring-like component which provides the screw thread.

This spring-like component may be located in position by its ends being screwed to the shaft.

Co-rotation of the screws may be achieved by providing complementary intermeshing gears thereon, and the means for rotating the screws may comprise a manually-operable handle or an electric motor.

The shredder of the invention may comprise an open-bottomed housing adapted, as desired, for securing to a wall, or to a table, or the like with bottom unobstructed, an opening in the top part of the housing being provided to facilitate insertion of the sheet material for shredding.

The opening can be in the form of a frusto pyramidal mouth.

DESCRIPTION OF THE PREFERRED EMBODIMENT

Figure 1:
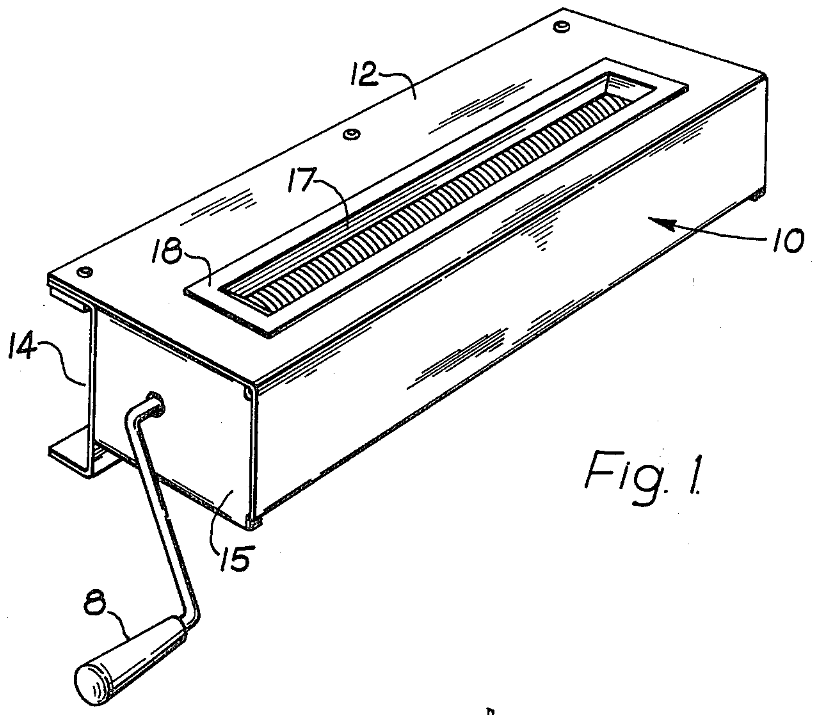
FIG. 1 is a perspective view of a preferred embodiment of a shredder constructed in accordance with the present invention.
Figure 2:
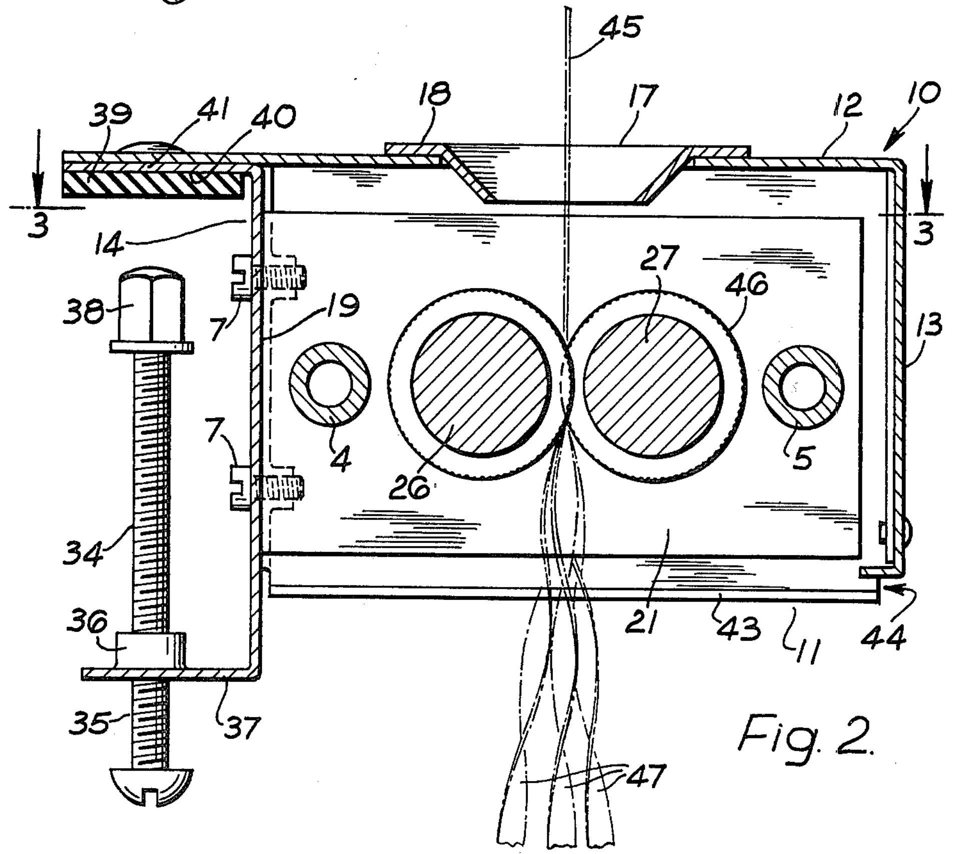
FIG. 2 is a lateral cross-section through the shredder of FIG. 1.
Figure 3:
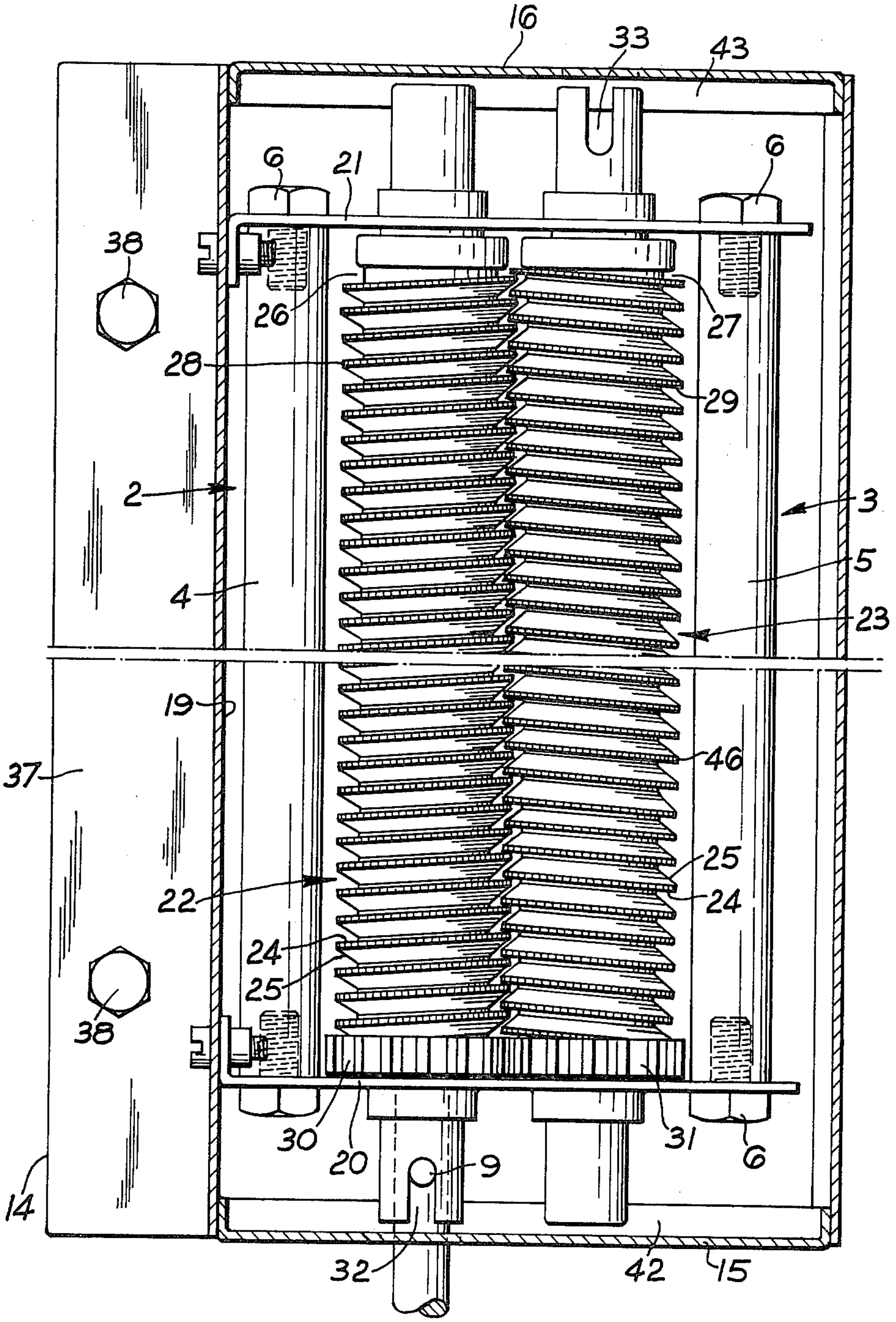
FIG. 3 is a cross-section along line 3—3 of FIG. 2.

The preferred embodiment of the shredder of the invention and suitable, for example, for office use, comprises a housing, designated as a whole by numeral 10, generally of rectangular box-like form, open-bottomed to provide an outlet 11 (see FIG. 2) from the housing 10, and having a top panel 12, side panels 13 and 14 respectively and end panels 15 and 16 respectively. A rectangular inlet opening 17 is provided in the top panel and surrounded by a frusto-pyramidal mouth plate 18.

Secured to the inner side 19 of side panel 14 by screws are two respective cantilever bearing brackets 20 and 21 accommodating respective ends of two screws 22 and 23 of which screw 22 is right-handed and screw 23 is left-handed. The screws 22 and 23 are buttress threaded, so that on each screw one face 24 of the helical thread is square to the axis of the screw while the other face 25 is inclined relative thereto.

The bearing brackets 20 and 21 are provided with spacers 2 and 3 respectively each of which comprises a tubular member 4 and 5 respectively with internally screw threaded end portions engaged by correspondingly screw threaded bolts 6 extending through bores in the plates 20 and 21. The two screws 22 and 23 extend parallel to one another beneath and parallel to the long direction of the inlet opening 17 and are in mesh with one another, that is to say the protruding parts or lands on the one screw protrude into the grooves of the threads of the other and vice versa. Moreover, the square faces 24 of the two screws face each other and are closely adjacent so that their edges cooperate after the manner of cutting blades or scissors.

The screws 22 and 23 may each have been made in conventional manner, e.g. by machining, so that threads are integral with a central shaft of the screw. In this embodiment, however, each of the screws 22 and 23 is of fabricated construction comprising a central shaft 26 or 27 respectively around which is disposed a respective helical spring-like component 28 or 29 which is secured to the respective shaft by countersunk screws (not shown) through respective holes (also not shown) adjacent each end of the spring-like component 28 or 29 and engaging into respective holes in the shaft 26 or 27. Naturally, the radial cross-section of the helical component 28 or 29 such as to correspond to the desired buttress-thread shape.

Each of the screws 22 and 23 has, adjacent one end, a respective gear wheel 30 and 31, these gear wheels meshing with one another, so that the two screws 22 and 23 will co-rotate in opposite directions. At one end of the screw 22, the shaft 26 is formed with a socket 32 and the other end of the shaft 27 of the screw 23 is similarly provided with a socket 33. This enables a handle 8 to be drivingly attached by a forked end 9 thereof to either of the screws 22 or 23 and therefore enables the shredder to be used by a left-handed as well as a right-handed person.

The side panel 14 of the housing 10 is of C-sectioned or channel-sectioned form and two clamps 34 are provided thereon to enable the entire shredder to be secured to a table, desk top or the like with the majority of the open bottom of the housing overhanging the table or desk.

Each clamp 34 comprises a respective screw 35 which extends through a respective internally threaded bush 36 on a lowermost side 37 of panel 14. One end of each screw 35 is provided with a respective hexagonal section head 38, the rounded upper portion of which engages the underside of an overhanging portion of the table or the like to which the shredder is to be attached. A strip 39 of rubber is attached to a downwardly facing surface 40 of an uppermost side 41 of panel 14 and serves to protect the upper surfaces of the table or the like to which the shredder is attached.

The end panels 15 and 16 of the housing have lower inwardly-directed flanges 42 and 43 respectively defining a mouth 44 into which an upper relatively-rigid surround of a receptacle (not shown), such as a sack, can be engaged so that the receptacle will receive shredded material.

With the shredder so disposed, clamped to a table top or the like, and the handle 8 being turned, the two screws 22 and 23 are co-rotated with their square faces 24 cooperating as cutters. Sheet material 45, such as paper intruduced edge-first to between the rotating screws 22 and 23 is gripped by the latter and progressed through the nip between the screws. This results in the material being shredded into narrow strips by being sheared by the cooperating outer edges of the square faces of the threads of the screws. As they are formed, the shreds are engaged by outer surfaces of teeth 46 of the screws and this has the effect of tending to groove the shreds longitudinally. As a consequence of this, in practical use of the shredder, the shreds tend to wind themselves into helical strips 47 emerging below the screws and winding themselves out of and away from the gaps between the screws. As a result, no strippers are necessary on the screws.

The invention is not confined to the precise details of the foregoing example and variations may be made thereto. Thus, for instance, instead of having a housing adapted to be clamped to a table or the like, the shredder of the invention may comprise a free-standing housing, which may if desired, be readily moved about and which may enclose the receptacle for the shreads. Of course, instead of being manually rotatable, the screws could be adapted to be motor driven.

Likewise the inlet and outlet may be orientated to front and rear respectively, instead of top and bottom as heretofore described.

I claim:

1. A shredder, for shredding sheet materials into twisted shreds, and being attachable to a suitable supporting structure and comprising: a complementary pair of left-hand and right-hand shaft-mounted screws arranged in parallelism and in mesh with each other, a gear wheel mounted on the shaft of each screw with the pair thereof being in mesh with each other for effecting the co-rotation of the shafts and respective screws in opposite directions, power means for rotating the shafts and screws, each screw being buttress-threaded for defining on one side of each helix a relatively square face and on the opposite side a face inclined toward the screw axis, the outermost peripheral surfaces of the helices of the screws being toothed for generating impressions transversely of the shreds of the sheet materials introduced thereto with a resultant winding of the shreds into helices, a housing for the mounting of the shafts relative thereto and having a longitudinal slit disposed adjacent and spaced from the meshing portions of the screws for receiving therethrough the sheet materials introduced thereto, attaching means for attaching the housing to the supporting structure, two cantilever bearing brackets for accommodating respective ends of the shafts and being attached to the housing, cylindrical spacing members having internally-threaded end portions for engagement by threaded bolts extending through the bearing brackets and being disposed between the bearing brackets for controlling the lateral spacing and relative disposition of the bearing brackets.

* * * * *